United States Patent [19]

Levin et al.

[11] Patent Number: 5,741,188
[45] Date of Patent: Apr. 21, 1998

[54] WATER OPERATED RIDE-ON TOYS AND GARDEN TOOLS

[76] Inventors: Hanoch Levin, 45 Haoren, 30095 Ramat Yishay; Ehud Nagler, 73 Hadeganiot, 36054 Kiryat Tivon, both of Israel

[21] Appl. No.: 693,659

[22] Filed: Aug. 9, 1996

[51] Int. Cl.[6] .................................................. A63G 31/00
[52] U.S. Cl. .................................................. 472/128; 472/27
[58] Field of Search .................................. 472/128, 130, 472/59, 60, 27

[56] References Cited

U.S. PATENT DOCUMENTS

| 4,205,785 | 6/1980 | Stanley | 472/128 X |
| 5,533,935 | 7/1996 | Kast | 472/130 |

Primary Examiner—Kien T. Nguyen
Attorney, Agent, or Firm—Mark M. Friedman

[57] ABSTRACT

Ride-on toys and garden tools operated solely by household water pressure, a ride-on toy or a garden tool according to the invention includes (i) a stationary element; (ii) a moveable element movably connected to the stationary element; (iii) water pressure operating means for moving the moveable element with respect to the stationary element; (iv) a water inlet for directing the household water into the operating means, the water inlet being in communication with a household water source; (v) a water outlet for directing the household water out from the operating means; and (vi) a valve for controlling the flow of the water through the operating means.

5 Claims, 10 Drawing Sheets

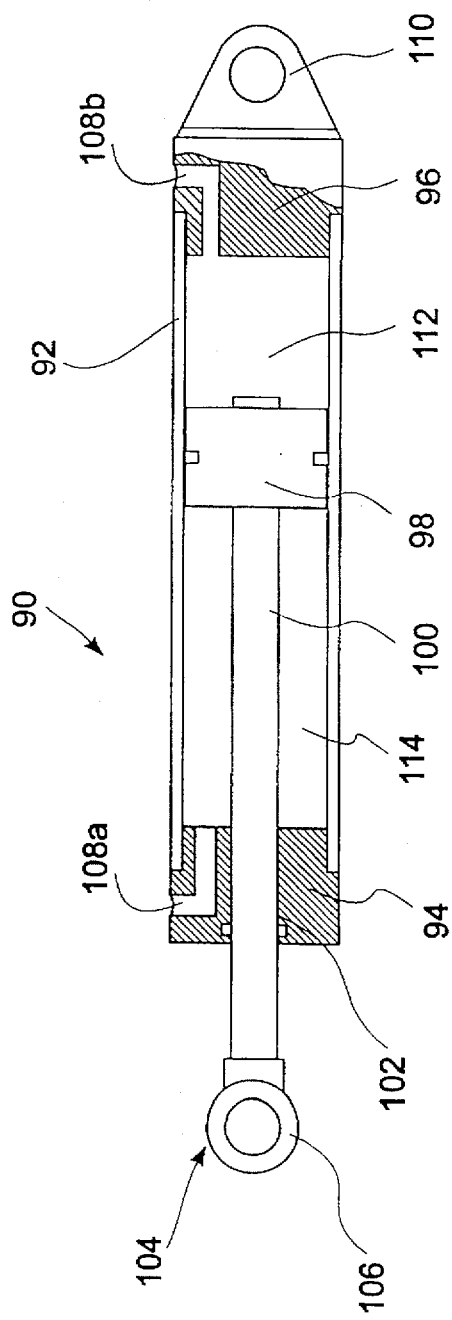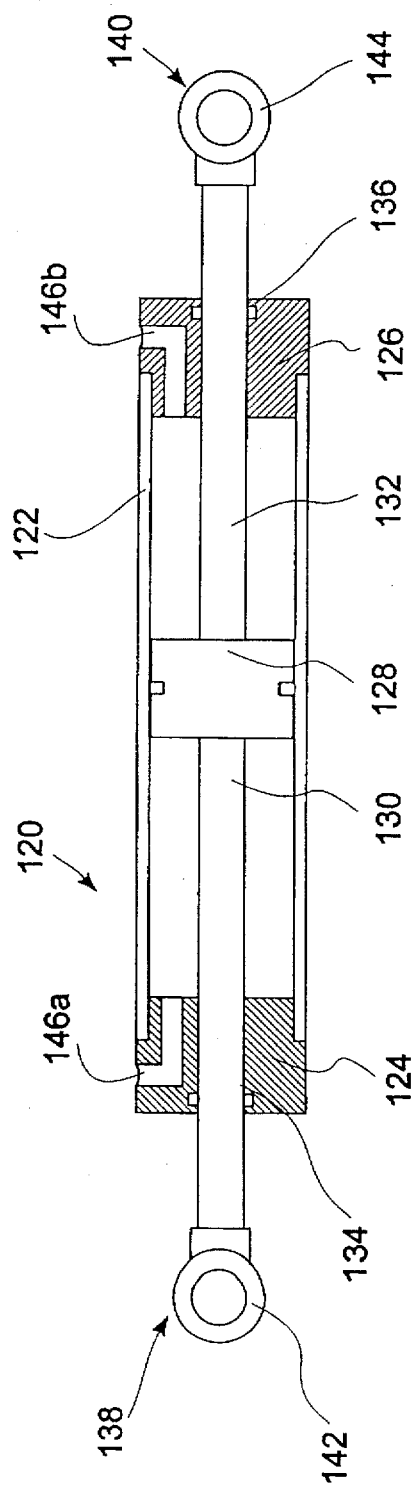
Fig. 4
Fig. 5

WATER OPERATED RIDE-ON TOYS AND GARDEN TOOLS

FIELD AND BACKGROUND OF THE INVENTION

The present invention relates to water operated devices. More particularly, the present invention relates to apparatuses such as ride-on toys and garden tools operated solely by water pressure.

Hydraulic pressure combined with a suitable actuator (e.g., a piston) or a suitable motor (e.g., a vane motor, a gerotor internal gear motor, an external gear motor, etc.) are known for a long time as direct means for moving objects or parts o thereof. Such use of hydraulic pressure has three major characterizations. First, the hydraulic liquid is contained in a closed reservoir and is recycled. Second, due to lubrication and pressure resistance properties, the hydraulic liquid is typically selected to be oil. And third, the pressure is provided by an electrically operated device. One example of such use of hydraulic pressure is the amusement helicopter disclosed in U.S. Pat. No. 4,492,372 to Lorence et al.

The pressure associated with blocking a flow of water by an obstacle is employed by mankind for centuries to move objects, perhaps the most familiar example is the water wheel of water driven flour mills, wherein the water flow is provided by a naturally occurring water stream (e.g., a river).

For the specific application of fluid operated bathtub lifts designed for invalid occupants, employed is a hydraulic pressure associated with an actuator, wherein the hydraulic liquid is household pressurized water discarded after use to a drain. Examples include U.S. Pat. Nos. 3,879,770 to Grant, U.S. Pat. No. 3,545,013 to Discoe, U.S. Pat. No. 3,381,317 to Daniels et al., and U.S. Pat. No. 5,279,004 to Walker.

For the specific application of a combined toy and water sprinkling device, employed is a hydraulic pressure associated with a vane motor, wherein the hydraulic liquid is household pressurized water which are used to water a lawn and operate the toy, as disclosed in U.S. Pat. No. 2,921,743 to Westover and Larson.

Thus, the scope of the prior art in using water based hydraulic pressure in combination with an actuator or motor is limited to very specific applications.

Ride-on toys such as carousels, rockers, bulldozers, tractors, etc., and garden tools such as ground drillers, lawn grazers, garden shears, etc., are presently all operated either electrically or with an internal combustion engine.

There is thus a widely recognized need for, and it would be highly advantageous to have, ride-on toys and garden tools operated solely by water pressure.

SUMMARY OF THE INVENTION

According to the present invention there is provided ride-on toys and garden tools operated solely by household water pressure.

According to further features in preferred embodiments of the invention described below, a ride-on toy or a garden tool according to the invention includes (i) a stationary element; (ii) a movable element movably connected to the stationary element; (iii) water pressure operating means for moving the moveable element with respect to the stationary element; (iv) a water inlet for directing the household water into the operating means, the water inlet being in communication with a household water source; (v) a water outlet for directing the household water out from the operating means; and (vi) a valve for controlling the flow of the water through the operating means.

According to still further features in the described preferred embodiments the operating means is a rotating motor.

According to still further feature in the described preferred embodiments the rotating motor is selected from the group consisting of a vane motor, a gerotor internal gear motor and an external gear motor.

According to still further features in the described preferred embodiments the operating means is an actuator.

According to still further features in the described preferred embodiments the actuator is selected from the group consisting of a linearly translating actuator and a rotatable actuator.

According to still further features in the described preferred embodiments the operating means is a converter of a translational movement to a rotational movement.

According to still further features in the described preferred embodiments the operating means is a converter of a rotational movement to a translational movement.

According to still further features in the described preferred embodiments the valve is selected from the group consisting of a linear selector valve and a rotating selector valve.

The present invention successfully addresses the shortcomings of the presently known configurations by providing ride-on toys and garden tools operated solely by water pressure, which toys/tools do not include electrical or internal combustion engines.

BRIEF DESCRIPTION OF THE DRAWINGS

The invention herein described, by way of example only, with reference to the accompanying drawings, wherein:

FIG. 4 is a cross-section view of a linear actuator used as a water operating means to operate the devices according to the present invention;

FIG. 5 is a cross-section view of a double sided linear actuator used as a water operating means to operate the devices according to the present invention;

DESCRIPTION OF THE PREFERRED EMBODIMENTS

The present invention is of water operated devices which can be used as ride-on toys and garden tools, etc. Specifically, the present invention can be used to operate ride-on toys and other devices, wherein the energy source for their operation is solely the household water pressure.

All devices according to the present invention are water pressure operated and although may have various functions, designs, and intended uses, they all share a minimal set of unique component.

Thus, all devices according to the present invention include a stationary element; a movable element movably connected to the stationary element; water pressure operating means for moving the moveable element with respect to the stationary element; a water inlet for directing the household water into the operating means, the water inlet is in communication with a household water source; a water outlet for directing the household water out from the operating means; and at least one valve for controlling the flow of water through the operating means. Upon entering the operating means via the water inlet as controlled by the valve, the household water pressure enforces the operating means to move, and the operating means thereby moves the moveable element relative to the stationary element.

The above terms and the principles and operation of water operated devices according to the present invention may be better understood with reference to the drawings and accompanying descriptions, which are limited to few examples and are therefore not intended to limit the scope of the present invention to the shown examples.

With reference now to FIGS. 1–7, shown are few examples of operating means which may be implemented (one or more) in any of the devices according to the present invention.

Figure 1:
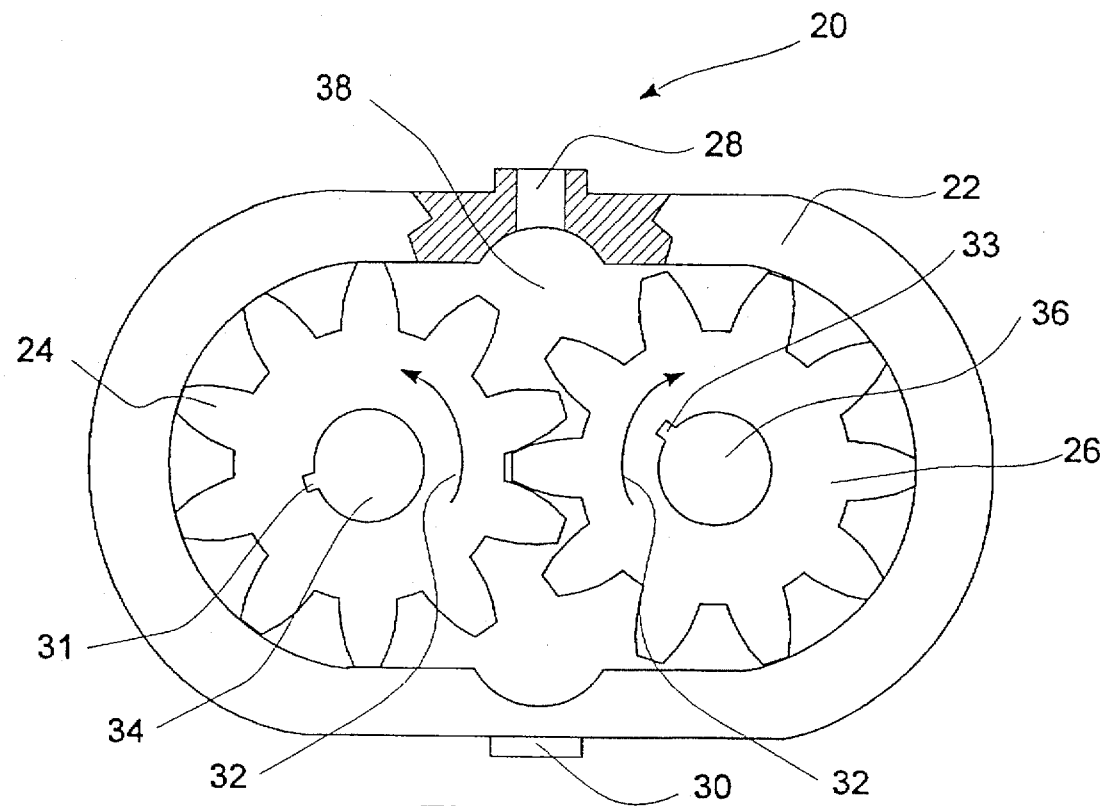
FIG. 1 is a cross-section view of an external gear motor used as a water operating means to operate the devices according to the present invention.
Figure 2:
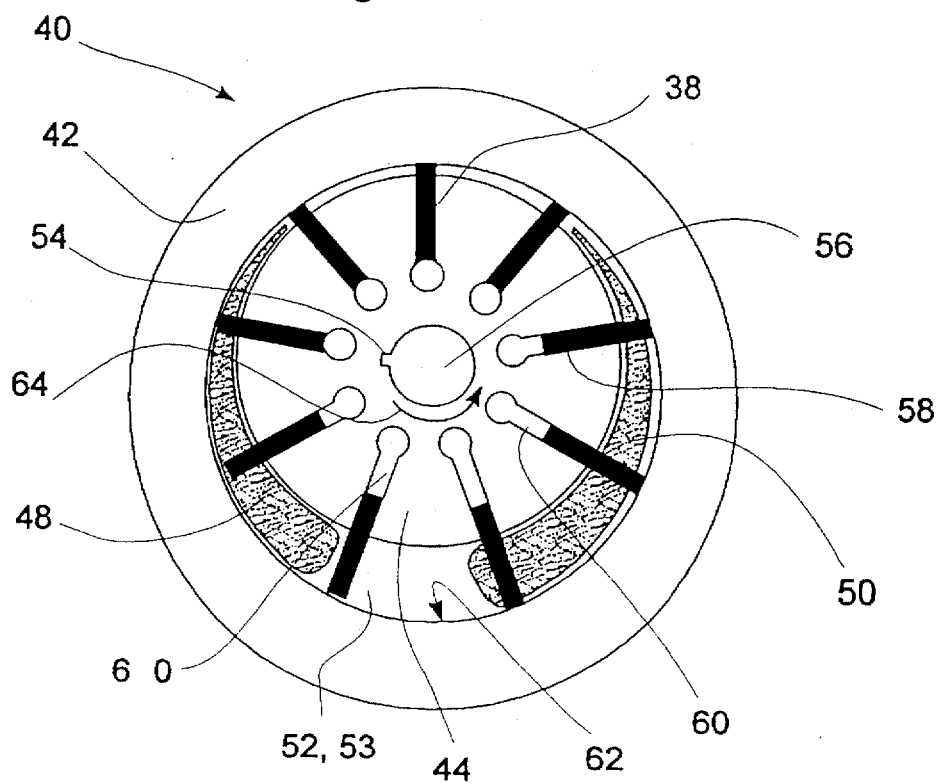
FIG. 2 is a cross-section view of a vane motor used as a water operating means to operate the devices according to the present invention.
Figure 3:
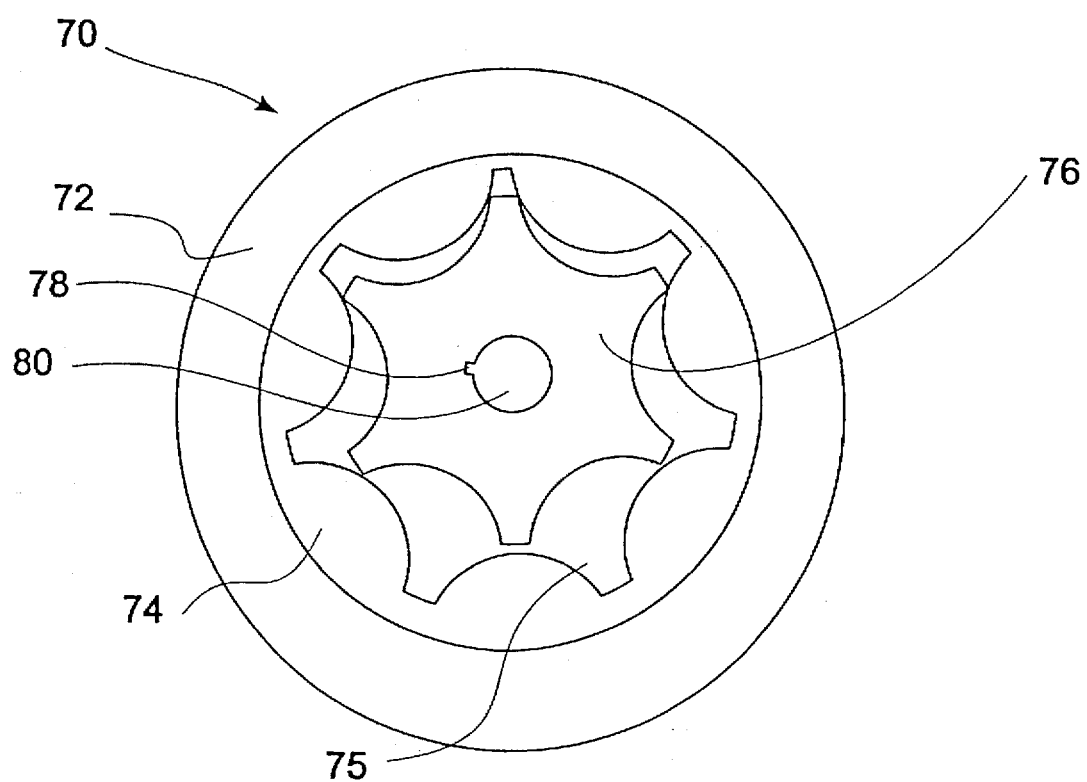
FIG. 3 is a cross-section view of a gerotor internal gear motor used as a water operating means to operate the devices according to the present invention.

FIGS. 1–3 show various types of water pressure operated rotating elements which can be implemented in the devices according to the present invention.

FIG. 1 shows a rotating element in the form of an external gear motor, referred hereinbelow as motor 20.

Motor 20 includes a housing 22, engaging a first 24 and a second 26 gears. Housing 20 is formed with a water inlet 28 and a water outlet 30. Gears 24 and 26 and housing 22 are sized and arranged such that water forced through inlet 28 would apply pressure on gears 24 and 26 such that they are forced to rotate as indicated by arrows 32. One of gears 24 and 26, say gear 24, is fixedly connected, as indicated by pin 31, to an idle shaft 34 itself rotatably accommodated by housing 20, whereas the other gear, say 26, is fixedly connected, as indicated by pin 33, to a motor shaft 36 itself rotatably accommodated by housing 20.

The operation of motor 20 is as follows. When a valve (not shown) which controls water inlet 28 is opened, water enter housing 20 via inlet 28 and pressure is built in a space 38 formed between gears 24 and 26 and housing 22. The pressure thus built forces gears 24 and 26 to rotate as indicated by arrows 32, and as a result motor shaft 36 rotates, and a movable element (not shown) connected thereto rotates therewith.

It is clear to one ordinarily skilled in the art that the direction of rotation of motor 20 can be determined by selecting appropriate positions for water inlet 28 and outlet 30. It is further appreciated that by having valves which can function alternately as permitting water in or out, outlet 30 may also function as an inlet and inlet 28 may also function as an outlet, to enable selecting the direction of rotation.

From the description of motor 20, the terms used hereinabove in the preceding description of the devices according to the present invention may be further illustrated. Thus, in the case of motor 20, (a) the stationary element is housing 20 or any element fixedly attached to housing 20, such as for example a base of a carousel as will be further exemplified hereinbelow; (b) the movable element is motor shaft 36 or any element attached thereto such as for example a ramp and seats of a carousel as will be further exemplified hereinbelow; (c) the operating means is motor 20 itself which has a water inlet and a water outlet, the flow of water through motor 20 is controlled by a valve used for example to start and stop the operation of motor 20.

As is understood by one ordinarily skilled in the art, other rotating elements may be used similarly to motor 20. Examples of such additional rotating elements are further exemplified in FIGS. 2 and 3.

FIG. 2 shows another type of rotating element, in the form of a vane motor, referred to hereinbelow as motor 40.

Motor 40 includes a housing 42 defining a space 52 for engaging a rotor 44, o such that the diameter of space 52 is larger than the diameter of rotor 44 and an asymmetric gap 53 is formed between rotor 44 and housing 42. Housing 42 is formed with a water inlet 48 and a water outlet 50. Rotor 44 is fixedly connected, as indicated by pin 54, to a motor shaft 56, itself rotatably accommodated by housing 42. Rotor 44 includes vane elements 58 extending towards the inner walls 62 of housing 42. Each of vane elements 58 is translationally accommodated in a specified cavity 60 formed in rotor 44. Each of cavities 60 is supplemented with a biasing means (not shown) forcing each of vane elements 58 onto inner walls 62 of housing 42.

The operation of motor 40 is as follows. When a valve (not shown) controlling water inlet 48 is opened, water enter housing 42 via inlet 48 and a directional pressure is built and forces vane elements 58 and as a result, rotor 44 and shaft 56 to rotate in the direction indicated by arrow 64.

It is clear to one ordinarily skilled in the art that the direction of rotation can be determined by selecting appropriate positions for water inlet 48 and outlet 50. It is further appreciated that by having valves which can function alternately as permitting water in or out, outlet 50 may also function as an inlet and inlet 48 may also function as an outlet, to enable selecting the direction of rotation of motor 40.

FIG. 3 shows yet another type of rotating element, in the form of a gerotor internal gear motor, referred to hereinbelow as motor 70. Motor 70 includes a housing 72, rotatably engaging an outer rotating element 74 formed with a space 75. An inner rotor 76 shaped as a star or the like is asymmetrically engaged within space 75. Housing 72 is formed with a water inlet (not shown) and a water outlet (not shown), both in communication with space 75. Rotor 76 is fixedly connected, as indicated by pin 78, to a motor shaft 80, itself rotatably accommodated by housing 42.

The operation of motor 70 is as follows. When a valve (not shown) controlling the water inlet is opened, water enter into space 75 via the inlet and a directional pressure is built and forces rotor 76, and as a result outer rotating element 74 and shaft 80, to rotate in a predefined direction away from the directional pressure formed by the water entering through the inlet.

It is clear to one ordinarily skilled in the art that the direction of rotation can be determined by selecting appropriate positions for the water inlet and outlet. It is further appreciated that by selecting valves which can function alternately as permitting water in or out, each outlet may also function as an inlet and vice versa, to enable selecting the direction of rotation of motor 70.

FIGS. 4-5 show types of water pressure operated actuators which can be implemented in the devices according to the present invention. FIG. 4 shows a water pressure operated actuator, in the form of a linear actuator, referred to hereinbelow as actuator 90. Actuator 90 includes a cylinder 92 having a front 94 and a rear 96 covers. Within cylinder 92 translatably engaged is a piston 98, which is capable of linearly translating along cylinder 92. Onto piston 98 connected is a rod 100 extending through a rod accepting hole 102 formed in front cover 94. At end 104, rod 100 is supplemented with connecting means 106, shown in FIG. 4 as rod eye 106. Connecting means 106 is for connecting actuator 90 to a movable element. Each of covers 94 and 96 is formed having a water inlet/outlet, 108a and 108b, respectively. Rear cover 96 is supplemented with a second connecting means 110, shown in FIG. 4 as a rod 110, which is for connecting actuator 90 to a stationary element The operation of actuator 90 is as follows. Assume piston 98 is situated against rear cover 96. At this situation the total length of actuator 90 is at its minimum. Then, pressurized water enter space 112 of cylinder 90 via water inlet 108b, forcing piston 98 away towards front cover 94. As a result, water present at space 114 of cylinder 92 are forced out via water outlet 108a. As a result, the total length of actuator 90 is increased. To shorten the length of actuator 90, the vice versa process is actuated, as well known in the art. It is apparent from the above description that water inlet/outlet 108a and 108b are controlled by valve(s) (not shown) having a dual function, wherein some times the valve(s) function at permitting pressurized water to enter the relevant space 114 and 112, respectively, whereas at other times, the valve(s) function as a chain to release occupying water from spaces 114 and 112.

From the above description of actuator 90, the terms used hereinabove in the preceding description of the devices according to the present invention may be further illustrated. Thus, in the case of actuator 90, (a) the stationary element is second connecting means 110 or any element fixedly attached to second connecting means 110 such as for example a ramp of bulldozer as will be further exemplified hereinbelow; (b) the movable element is rod 100 and its connective components (e.g., piston 98 and rod eye 106) or any element attached thereto such as for example an arm of the bulldozer as will be further exemplified hereinbelow; (c) the operating means is actuator 90 itself which has water inlets and water outlets, the water inlets and outlets are controlled by valves used to start, stop and determine the amount and direction of the operation of actuator 20.

FIG. 5 shows yet another water pressure operated actuator, in the form of a double sided linear actuator, referred to hereinbelow as actuator 120. As actuator 90, actuator 120 includes a cylinder 122 having a first 124 and a second 126 covers. Within cylinder 122 translatably engaged is a piston 128, which is capable of linearly translating along cylinder 122. Onto piston 98 connected are a first 130 and a second 132 rods extending through rod accepting holes 134 and 136 formed in first 124 and second 126 covers, respectively. At ends 138 and 140, rods 130 and 132 are supplemented with connecting means 142 and 144, shown in FIG. 4 as rod eyes 142 and 144, respectively. Connecting means 142 and 144 are for connecting actuator 120 to a movable element/a stationary element. Each of covers 124 and 126 is formed having a water inlet/outlet, 146a and 146b, respectively.

The operation of actuator 120 is similar to as described above for actuator 90 by controlling the flow of water via water inlet/outlet 146a and 146b.

Figure 6:
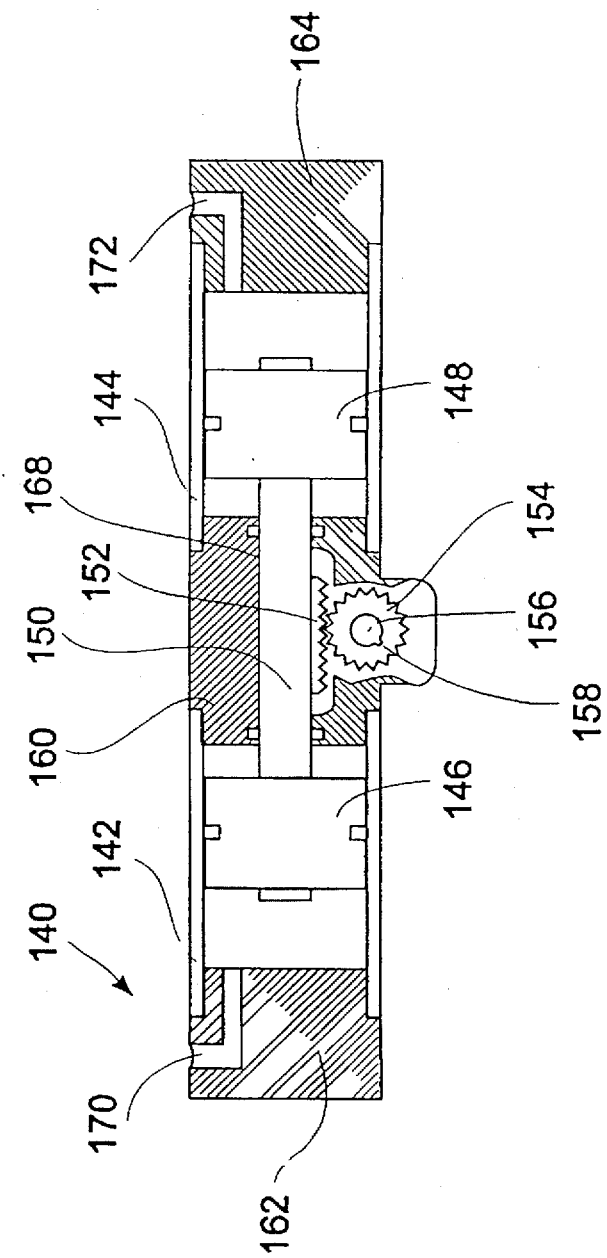
FIG. 6 is a cross-section view of an element suitable for conversion of linear motion to rotary motion used as a water operating means to operate the devices according to the present invention.

FIG. 6 shows a type of water pressure operated element suitable for conversion of a linear motion to a rotational motion, referred to hereinbelow as converter 140, which can be implemented in the devices according to the present invention.

Converter 140 includes a first 142 and a second 144 cylinders, within each translatably engaged is a piston 146 and 148, respectively. Pistons 146 and 148 are connected therebetween by a rod supplemented with a rack 152. Rack 152 is in gear contact with a gear 154, fixedly connected to a shaft 156 as indicated by pin 158, shaft 158 is rotatably accommodated by a housing 160 which also operates as internal covers of cylinders 142 and 144. Housing 160 is formed with a channel 168 for accommodating rod 150. Cylinders 142 and 144 are further supplemented with end covers 162 and 164, respectively, each of end covers 162 and 164 includes a water inlet/outlet 170 and 172, respectively. Operating converter 140 is by controlling the operation of water inlet/outlets 170 and 172, causing rod 150 and rack 152 to translate and therefore to rotate gear 154 and shaft 156.

A similar construction may be devices to convert a rotational motion to a linear motion.

Figure 7:
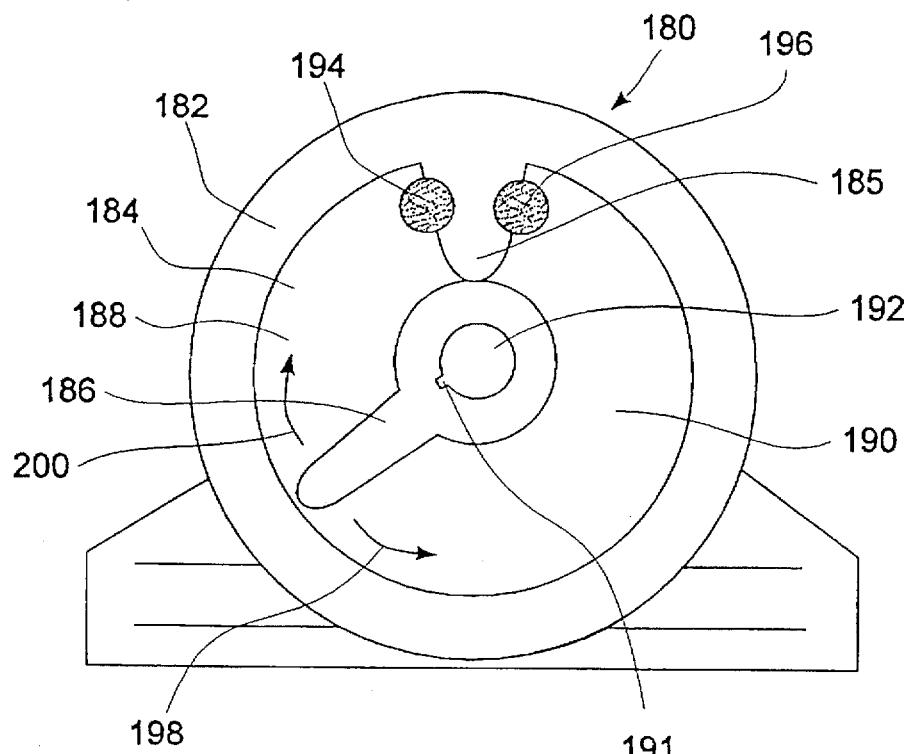
FIG. 7 is a cross-section view of a rotating actuator used as a water operating means to operate the devices according to the present invention.

FIG. 7 shows a type of water pressure operated actuator in the form of a rotating actuator, referred to hereinbelow as actuator 180, which can be implemented in the devices according to the present invention.

Actuator 180 includes a housing 182 formed having an internal space 184 disturbed by a stoppage 185 protruding into space 184. Actuator 180 further includes a rotating pointer 186, dividing space 184 into a first 188 and a second 190 parts. Rotating pointer 186 is fixedly attached, as indicated by pin 191, to a shaft 192, shaft 192 is rotatably accommodated by housing 180. Actuator 180 further includes a first 194 and a second 196 water inlets/outlets.

The operation of actuator 180 is as follows. When pressurized water enter via one of the water inlets 194 and 196, say 194, into one part, say 188, of space 184, pointer 186 and thus shaft 192 are forced to rotate as indicated by arrow 198, and water from the other part, say 190, of space 184 are forced to leave via water outlet 196, whereas when pressurized water enter the other part, say 190, pointer 186 and thus shaft 192 are forced to rotate to the opposite direction as indicated by arrow 200.

FIGS. 1-7 described hereinabove thus show various examples for the water pressure operating means as used herein and in the claims section to follow.

Figure 8:
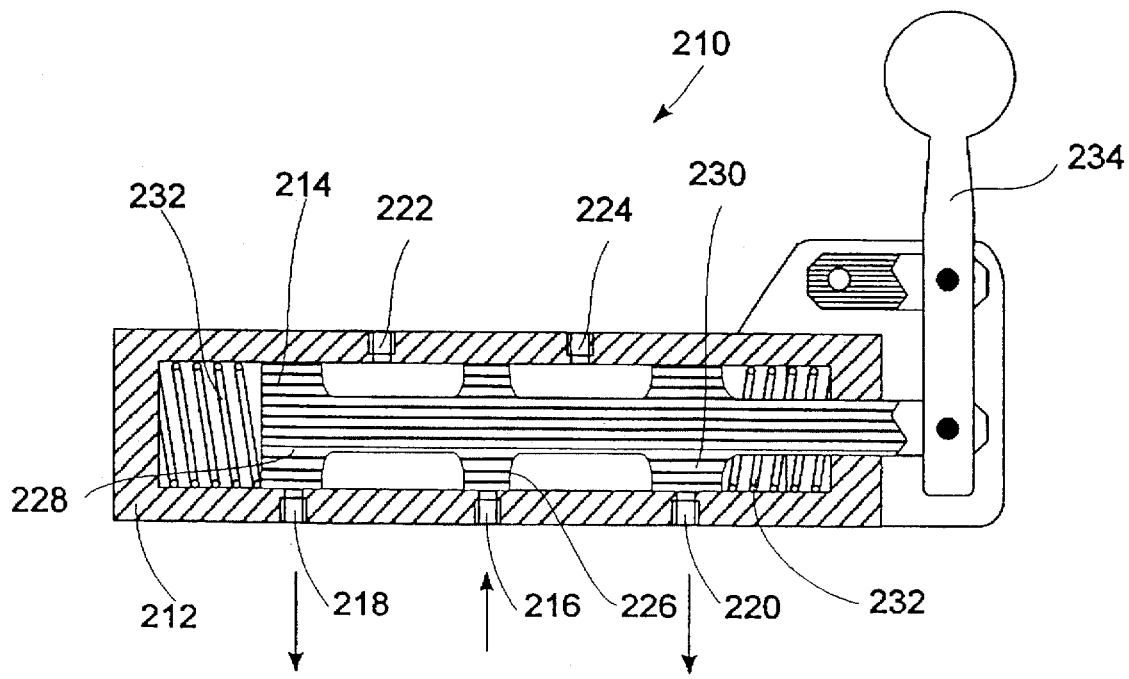
FIG. 8 is a cross-section view of a lineal selector valve implemented in the devices according to the present invention.
Figure 9:
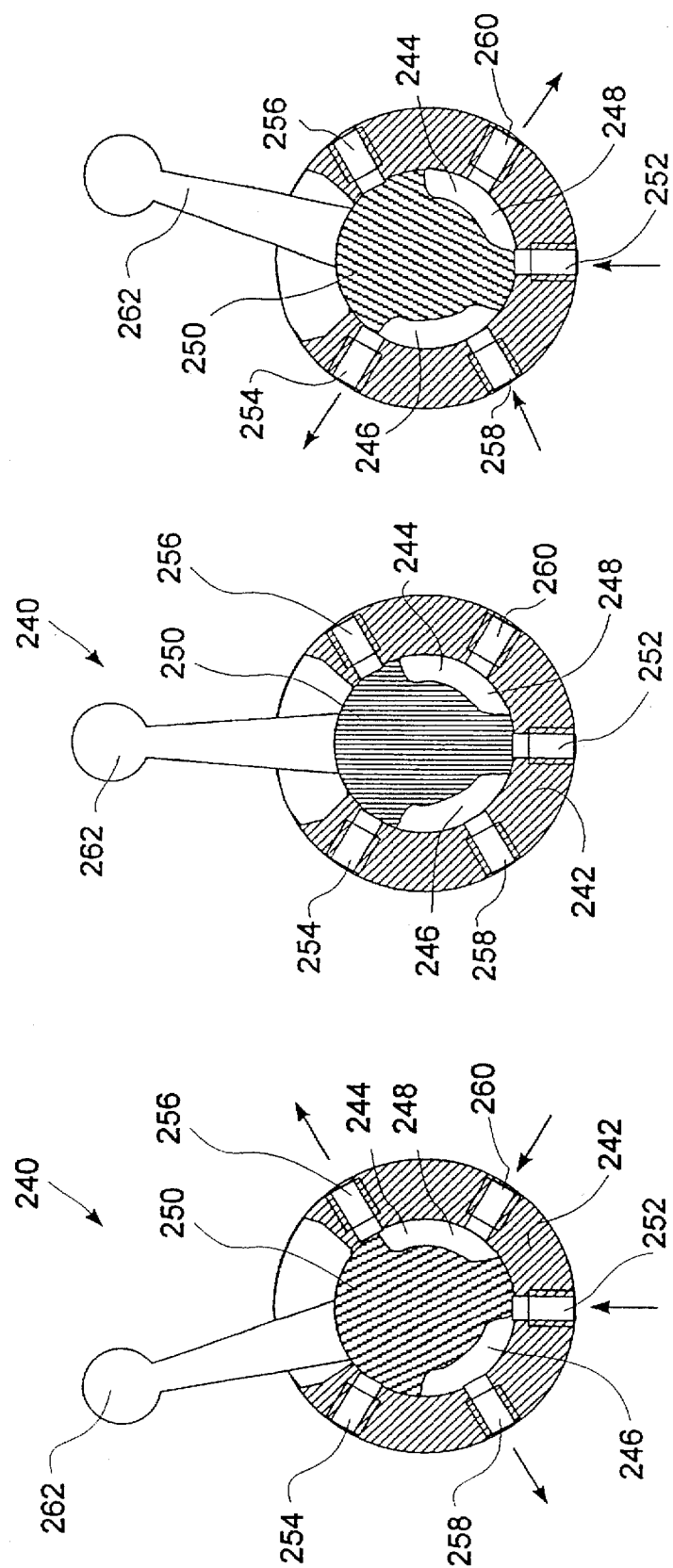
FIGS. 9a–c are cross-section views of a rotating selector valve implemented in the devices according to the present invention in three operation modes.

Operating the operating means according to the present invention is by a water pressure which is controlled by valve(s). The valve(s) according to the present invention may be of various types, accomplish various functions and operate according to various mechanisms, some of which are shown in FIGS. 8–9. FIG. 8 shows a possible configurations of a linear selector valve, referred to hereinbelow as selector valve 210. Selector valve 210 includes a housing 212 accommodating a plunger 214. Housing 212 is formed having a pressurized water inlet 216, a first 218 and a second 220 drains and a first 222 and a second 224 pressurized water outlets. Plunger 214 includes a central valve 226 and two peripheral valves 228 and 230. Valves 228 and 230, inlet 216, drains 218 and 220 and pressurized water outlets 222 and 224 are arranged such that three operation modes exist for selector valve 210. In the first, valve 226 blocks inlet 216 and no water flow through selector valve 210. Selector valve 210 is maintained at the first operation mode by biasing means (e.g., springs) 232, rendering this mode the default mode. In the second mode of operation, plunger 214 is translated via a lever 234 connected thereto such that inlet 226 becomes in communication with outlet 224 and drain 218 becomes in communication with outlet 222. And finally, in the third mode of operation, plunger 214 is translated via lever 234 such that inlet 226 becomes in communication with outlet 222 and drain 220 becomes in communication with outlet 224. Pressurized water outlets 222 and 224 are communicated to water outlets/inlets of any of the above described operating means (FIGS. 1–7) and may thus function both as pressurized water suppliers and as drains. FIGS. 9a–c show a possible configurations of a rotating selector valve, referred to hereinbelow as selector valve 240. Selector valve 240 includes a housing 242 defining a space 244 divided into a first 246 and a second 248 sections by a rotatable spool valve 250. Housing 242 is formed having a pressurized water inlet 252, a first 254 and a second 256 drains and a first 258 and a second 260 pressurized water outlets. Spool valve 250 is manually rotatable in either direction by a lever 262 connected thereto. The locations of sections 246 and 248, inlet 252, drains 254 and 256 and pressurized water outlets 258 and 260 are selected such that three operation modes exist for selector valve 240. In the first, shown in FIG. 9a, spool valve 250 blocks inlet 252. In the second, shown in FIG. 9b, inlet 252 and outlet 258 are in communication via section 246 of space 244, whereas drain 256 is in communication with outlet 260 via section 248 of space 244. And finally, in the third, shown in FIG. 9c, inlet 252 and outlet 260 are in communication via section 248 of space 244, whereas drain 254 is in communication with outlet 258 via section 246 of space 244.

Figure 10:
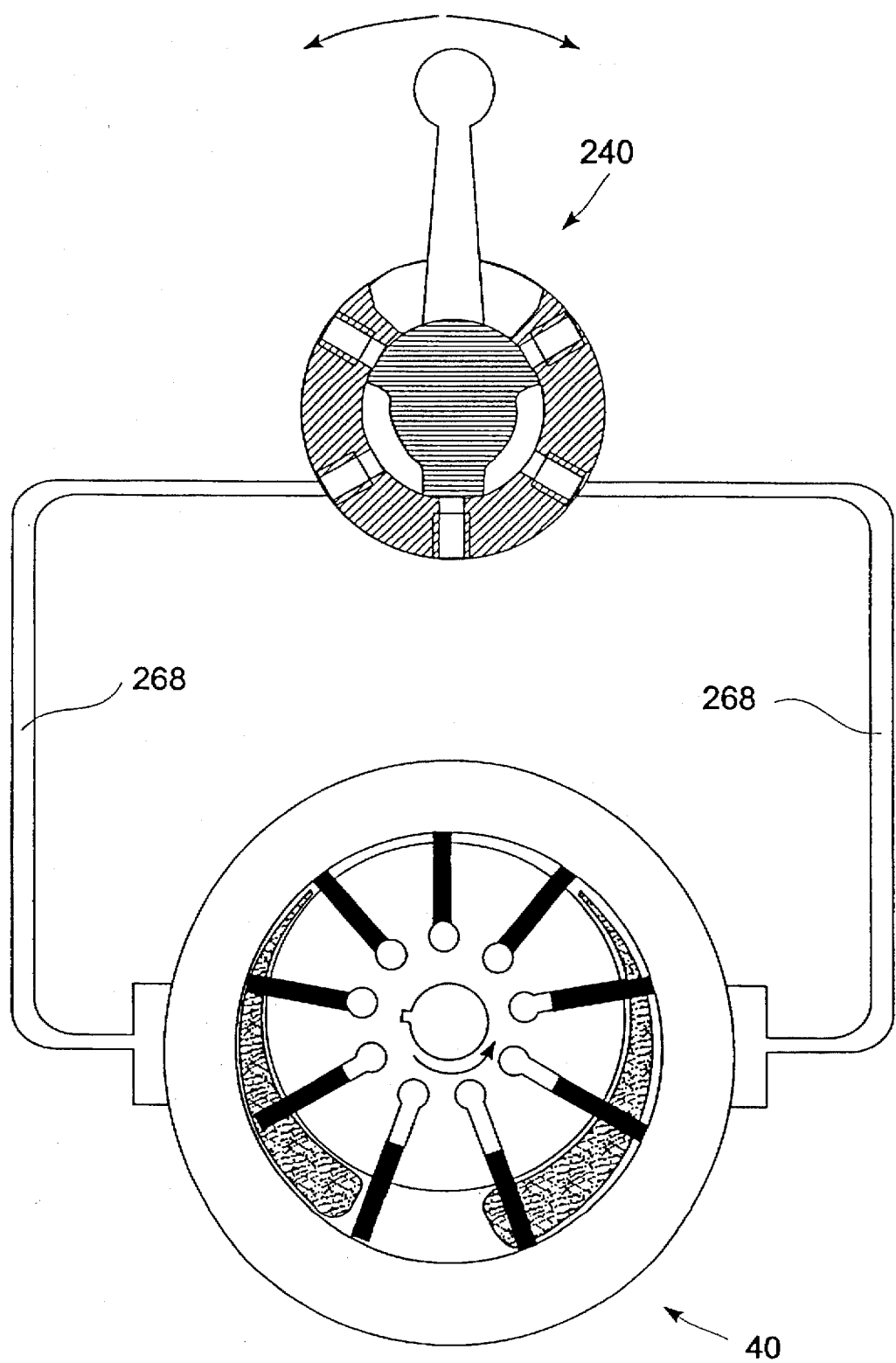
FIG. 10 is a cross-section view of the rotating selector valve of FIGS. 9a–c connected to the vane motor of FIG. 2.
Figure 11:
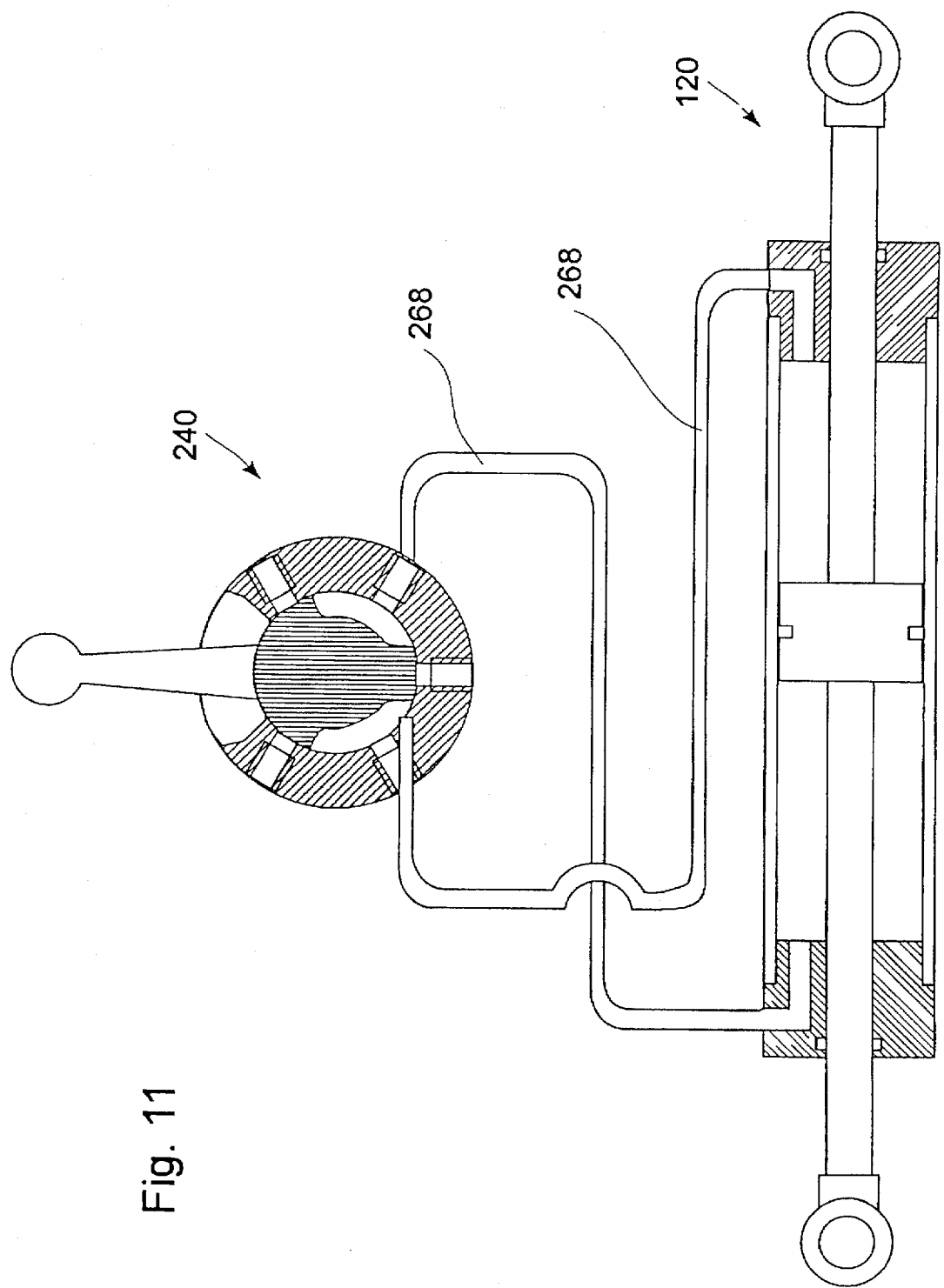
FIG. 11 is a cross-section view of the rotating selector valve of FIGS. 9a–c connected to the double sided linear actuator of FIG. 5.

FIGS. 10 and 11 show possible connections of selector valve 240 of FIGS. 9a–c with vane motor 40 of FIG. 2 and with double sided linear actuator 120 of FIG. 5, respectively, using water tubes 268. As is apparent to one ordinarily skilled in the art, in both cases, selecting the operation mode of selector valve 240 as described above under FIGS. 9a–c, dictates the direction of operation of either motor 40 or actuator 120.

Figure 12:
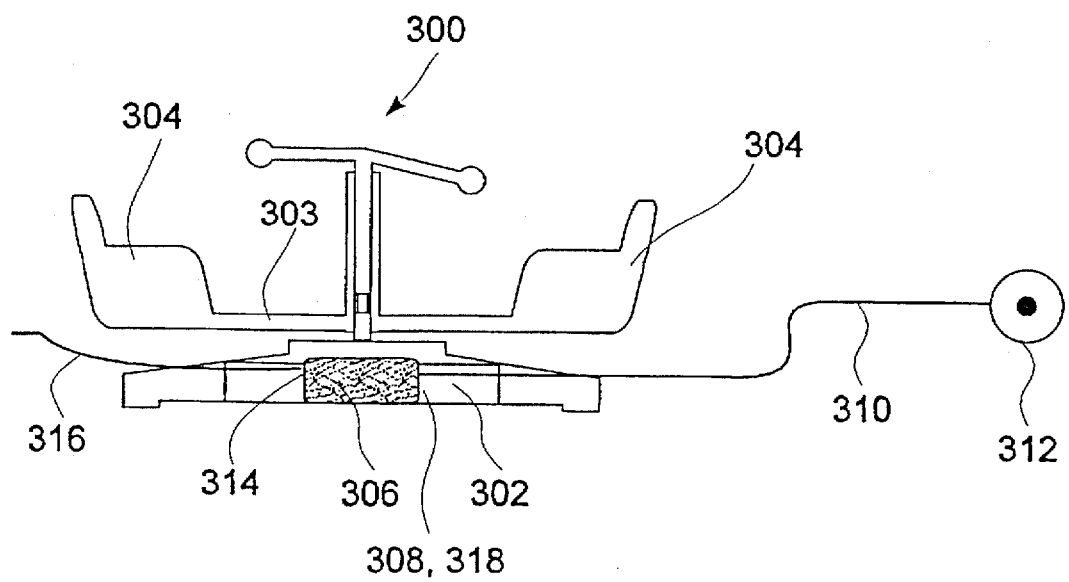
FIG. 12 is a cross-section view of a carousel according to the present invention.
Figure 13:
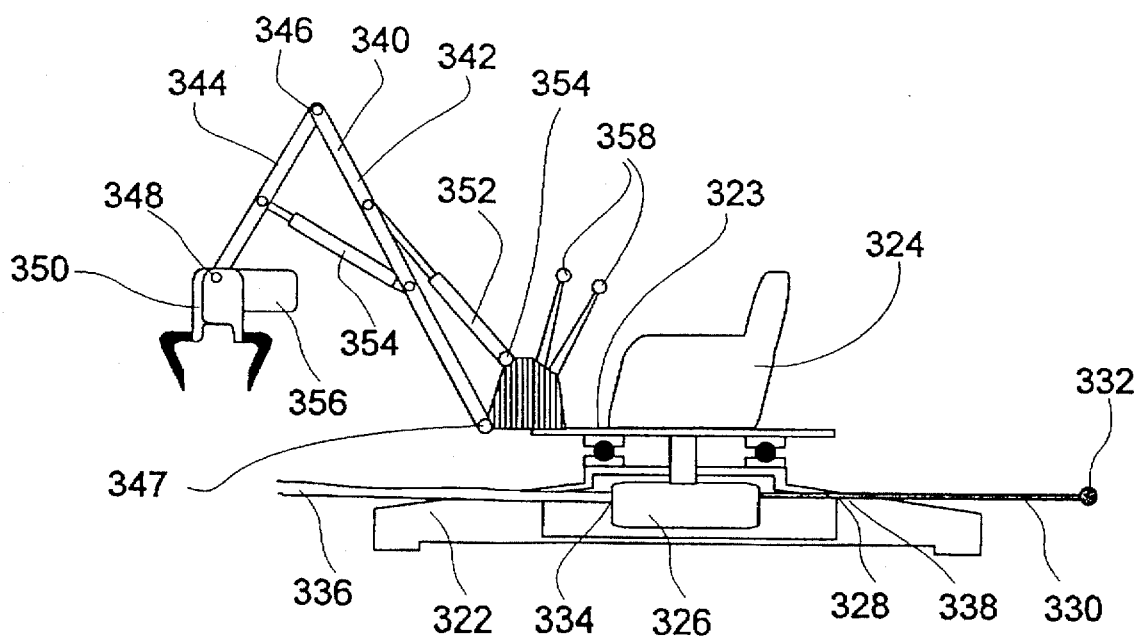
FIG. 13 is a cross-section view of a bulldozer according to the present invention.

With reference now to FIGS. 12 and 13, presented are two possible ride-on toy devices according to the present invention.

FIG. 12 shows a ride-on carousel according to the present invention, referred to hereinbelow as carousel 300. Carousel 300 includes a stationary element in the form of a stationary ground base 302. Carousel 300 further includes a movable element in the form of a ramp 303 and seats 304 movably (e.g., rotatably) connected to stationary element, i.e., base 302. Carousel 300 further includes water pressure operating means 306 for moving (e.g., rotating) moveable elements 303 and 304 with respect to stationary element 302. Operating means 306 may be selected from the rotating operating means described under FIGS. 1–3 above. Carousel 300 further includes a water inlet 308 for directing pressurized water into operating means 306. For that purpose, in a preferred embodiment water inlet 308 is in communication as indicated by tube 310 with a household water source 312. Carousel 300 further includes a water outlet 314 for directing the water out from operating means 306, a second tube 316 is preferably directing the water to the house drain. Carousel 300 further includes one valve 318 for controlling the flow of water through operating means 306. It will be appreciated by one ordinarily skilled in the art that any of selector valves 210 or 240 shown in FIGS. 8–9 may be implemented within carousel 300 to control its operation and its direction of operation, yet other valves are also possible.

FIG. 13 shows a ride-on bulldozer according to the present invention, referred to hereinbelow as bulldozer 320. Bulldozer 320 includes a stationary element in the form of a stationary ground base 322. Bulldozer 320 further includes a movable element in the from of a ramp 323 and an operator seat 324 movably (e.g., rotatably) connected to the stationary element, i.e., base 322. Bulldozer 320 further includes water pressure operating means 326 for moving (e.g., rotating) moveable elements 323 and 324 with respect to stationary element 322. Operating means 326 may be selected from the rotating operating means described under FIGS. 1–3 above. Bulldozer 320 further includes a water inlet 328 for directing household water into operating means 326, water inlet 328 is in communication as indicated by tube 330 with a household water source 332. Bulldozer 320 further includes a water outlet 334 for directing the household water out from operating means 326, a second tube 336 is preferably directing the water to the household drain. Bulldozer 320 further includes a first valve 338 for controlling the flow of water through operating means 326. It will be appreciated o by one ordinarily skilled in the art that any of selector valves 210 or 240 shown in FIGS. 8–9 may be implemented within bulldozer 320 to control its operation and its direction of operation, yet other valves are also possible.

Bulldozer 320 further includes an elevation arm 340 having a first 342 and a second 344 elevation segments hingedly connected to one another by a hinge 346. End 345 of first segment 342 is hingedly connected to ramp 323 via hinge 347. To end 348 of second segment 344 hingedly connected is a gripper 350. First segment 342 is connected to water pressure operating means in the form of a first linear actuator 352 which is connected to a control station 354 fixedly attached to ramp 323, such that lengthening or shortening the total length of actuator 352 affects the amount of elevation of first segment 342, as well known in the art. Segments 342 and 344 are further connected therebetween by one additional water pressure operating means in the form of a second linear actuator 354, such that lengthening or shortening the total length of actuator 354 affects the amount of elevation of second segment 344. Yet, one additional actuator 356 control the opening and closing of gripper 350, as well known in the art. In a preferred embodiment, control station 354 includes control sticks 358 for controlling the various valves of the operating means used to operate the various components of bulldozer 320.

Considering for example actuator 352 and components connected to it reveals that bulldozer 320 includes a stationary element (e.g., station 354), a movable element movably connected to the stationary element (e.g., segment 342), operating means for moving the moveable element with respect to the stationary element (e.g., actuator 352), a water inlet (not shown) for directing the household water into the operating means, the water inlet is in communication with a household water source (not shown), a water outlet for directing the household water out from said operating means (not shown) and a valve for controlling the flow of water through operating means 352. It will be appreciated that a similar analysis can be made regarding any of the additional operating means deployed in bulldozer 320 as described above.

Carousel 300 and bulldozer 320 provide two examples of a ride-on toy according to the present invention. As is understood by one ordinarily skilled in the art, other ride-on toys, such as but not limited to rockers, tractors, etc., may be similarly operated employing pressurized household water as a sole energy source for their operation. In fact, any of the water pressure operating means presented in FIGS. 1–7, or other similar means, may be implemented in any of the ride-on toys according to the present invention. Furthermore, any of the valves of FIGS. 8–9 or any other valve may be used to control the water flow through the operating means implemented in the ride-on toys according to the present invention.

Figures 14A, 14B:
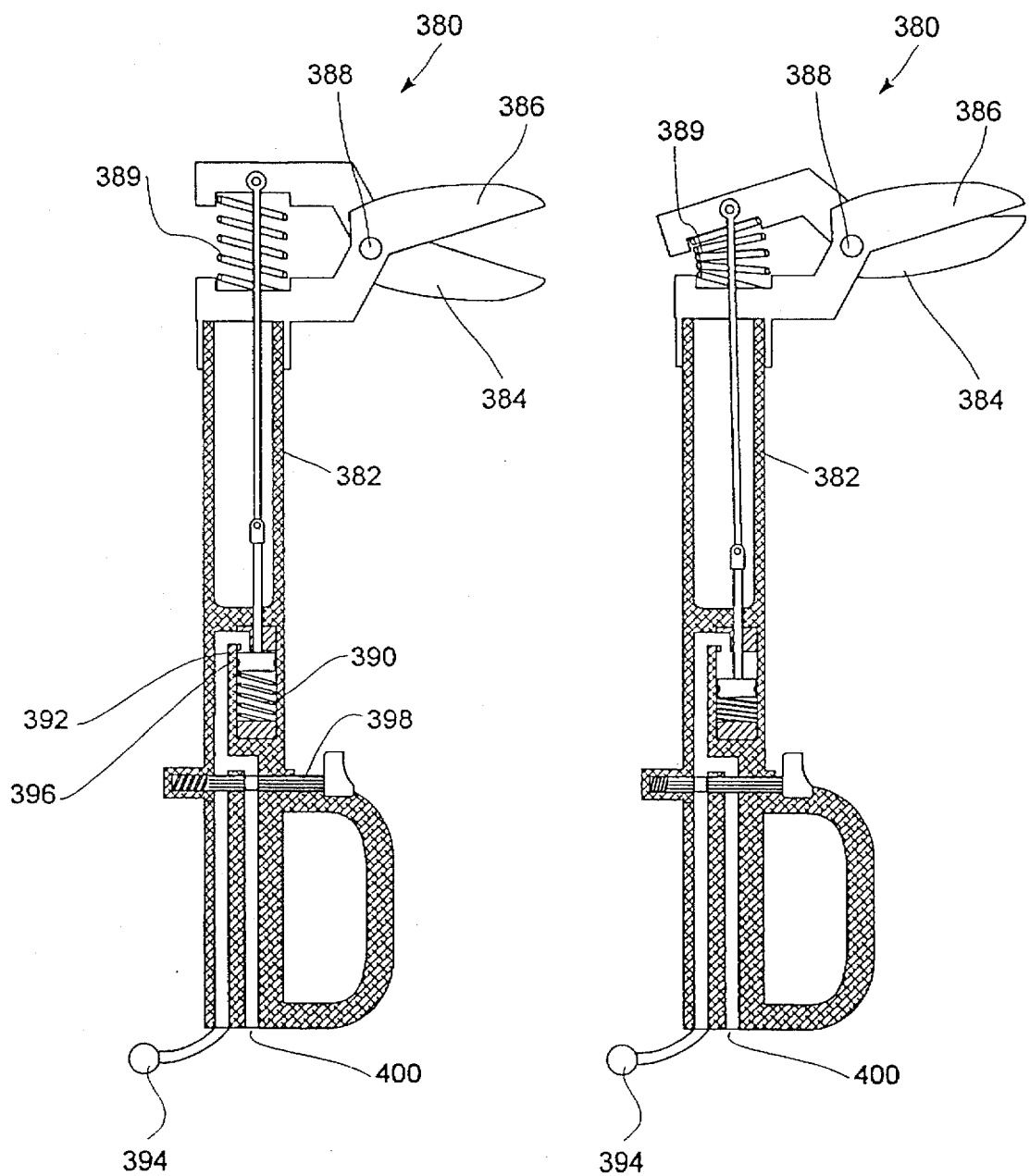
FIGS. 14a–b are cross-section views of garden shears according to the present invention.

With reference now to FIGS. 14a–b, presented is a garden tool in the form of garden shears according to the present invention, referred to hereinbelow as tool 380. Tool 380 includes a stationary element in the form of a handle 382 to which attached is a first shearing element 384. Tool 380 further includes a movable element in the form of second shear element 386 movably connected to the stationary element via hinge 388. A biasing device 389 keeps first 384 and second 386 shearing elements in an open arrangement, as shown in FIG. 15a. Tool 380 further includes water pressure operating means in the from of springed linear actuator 390 for moving the moveable element 386 with respect to the stationary element 384. Tool 380 further includes a water inlet 392 for directing the household water into operating means 390, water inlet 392 is in communication with a household water source 394. Tool 380 further includes a water outlet 396 for directing the household water out from operating means 390. In fact, in the configuration shown in FIGS. 15a–b, water inlet 392 and water outlet 396 are a single element. Tool 380 further includes a springed valve 398 for controlling the flow of water through operating means 390.

The operation of tool 380 is as follows. When valve 398 is in a first position as shown in FIG. 15a, actuator 390 is maximally extended and as a result, shearing elements 384 and 386 are spaced apart in the open at arrangement. During the first position of valve 398, water outlet 396 is in communication with a drain 400. When, on the other hand, valve 398 is in a second position as show FIG. 15b, actuator 390 is minimally extended and as a result shearing elements 384 and 386 are closed together. During the second position of valve 398, water inlet 392 is in communication with pressurized water source 394.

Garden shears 380 provide one example of a garden tool according to the present invention. As is understood by one ordinarily skilled in the art, other garden tools, such as but not limited to ground drillers and lawn grazers, etc., may be similarly operated employing pressurized household water as a sole energy source for their operation. In fact, any of the water pressure operating means presented in FIGS. 1–7, or other similar means, may be implemented in any of the garden tools according to the present invention. Furthermore, any of the valves of FIGS. 8–9 or any other valve may be used to control the water flow through the operating means implemented in the garden tools according to the present invention.

It will be appreciated by one ordinarily skilled in the art that various types of implementations may be further implemented in the devices according to the present invention. Thus for example a frequency meter, a valve controller and a flow rate regulator may be implemented in any of the devices to further control their operation.

As mentioned throughout this disclosure, the ride-on toys and garden tools according to the present invention are solely water pressure operated. A household water pressure (e.g., from the city water net) is typically in the range of 1–6 Atmospheres and is sufficient to operate the inventive devices. As being solely water operated, the devices according to the invention enjoy various advantages as compared with equivalent prior art devices supplemented with an electrical or internal combustion engines. As prior art ride-on toys and garden tools include an electrical or internal combustion engines, they are (i) expensive as compared to the inventive devices; (ii) noisier; and (iii) increase air pollution. The ride-on toys and garden tools according to the present invention on the other hand are simple to manufacture and may be easily operated both outdoors and indoors (provided they are connected to the drain).

While the invention has been described with respect to a limited number of embodiments, it will be appreciated that many variations, modifications and other applications of the invention may be made.

What is claimed is:

1. A household water pressure operated device comprising an apparatus selected from the group consisting of a ride-on toy and a garden tool, the apparatus including:

(i) a stationary element;

(ii) a movable element movably connected to said stationary element;

(iii) a water pressure operating rotating motor for moving said moveable element with respect to said stationary element;

(iv) a water inlet for directing the household water into said rotating motor, said water inlet being in communication with a household water source;

(v) a water outlet for directing the household water out from said rotating motor; and (vi) a valve for controlling the flow of the water through said rotating motor.

2. A device as in claim 1, wherein said rotating motor is selected from the group consisting of a vane motor, a gerotor internal gear motor and an external gear motor.

3. A device as in claim 1, wherein said valve is selected from the group consisting of a linear selector valve and a rotating selector valve.

4. A household water pressure operated device comprising an apparatus selected from the group consisting of a ride-on toy and a garden tool, the apparatus including:

(i) a stationary element;

(ii) a movable element movably connected to said stationary element;

(iii) a water pressure operating rotatable actuator being for moving said moveable element with respect to said stationary element;

(iv) a water inlet for directing the household water into said actuator, said water inlet being in communication with a household water source;

(v) a water outlet for directing the household water out from said actuator; and (vi) a valve for controlling the flow of the water through said actuator.

5. A household water pressure operated device comprising an apparatus selected from the group consisting of a ride-on toy and a garden tool, the apparatus including:

(i) a stationary element; (ii) a movable element movably connected to said stationary element;

(iii) water pressure operating means for moving said moveable element with respect to said stationary element, said operating means is selected from the group consisting of a converter of a translational movement to a rotational movement and a converter of a rotational movement to a translational movement;

(iv) a water inlet for directing the household water into said operating means, said water inlet being in communication with a household water source;

(v) a water outlet for directing the household water out from said operating means; and (vi) a valve for controlling the flow of the water through said operating means.

* * * * *